(12) United States Patent
Oh

(10) Patent No.: US 8,027,105 B2
(45) Date of Patent: Sep. 27, 2011

(54) LENS BARREL ASSEMBLY AND METHOD

(75) Inventor: Hyun-min Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/534,958

(22) Filed: Aug. 4, 2009

(65) Prior Publication Data

US 2010/0033851 A1 Feb. 11, 2010

(30) Foreign Application Priority Data

Aug. 6, 2008 (KR) .................. 10-2008-0077054

(51) Int. Cl.
*G02B 7/02* (2006.01)
(52) U.S. Cl. ...................... 359/823; 359/824
(58) Field of Classification Search .......... 359/694–704, 359/811–824, 826, 829
See application file for complete search history.

(56) References Cited

U.S. PATENT DOCUMENTS

| | | | | |
|---|---|---|---|---|
| 5,793,537 A * | 8/1998 | Nomura et al. | ............... | 359/700 |
| 6,392,827 B1 * | 5/2002 | Ueyama et al. | ............... | 359/824 |
| 7,230,773 B2 * | 6/2007 | Nomura et al. | ............... | 359/696 |
| 7,280,291 B2 * | 10/2007 | Tsuji | ............................ | 359/819 |
| 7,362,522 B2 * | 4/2008 | Ohsato | .......................... | 359/824 |
| 7,573,656 B2 * | 8/2009 | Uehara | ......................... | 359/811 |
| 7,663,811 B2 * | 2/2010 | Noda et al. | .................... | 359/696 |

* cited by examiner

*Primary Examiner* — Mohammed Hasan
(74) *Attorney, Agent, or Firm* — Drinker Biddle & Reath LLP

(57) ABSTRACT

Provided is a lens barrel assembly and method. The lens barrel assembly including: a lens barrel in which at least one lens is installed; a driving member that moves the lens barrel in the direction of an optical axis; a base at which the driving member is accommodated; a guide member that is formed on the base and guides a movement of the lens barrel; and an elastic unit that connects the base and the lens barrel and includes a plurality of elastic members. The lens barrel assembly can improve image quality of an image processing device by stabilizing the movement of the lens barrel.

17 Claims, 3 Drawing Sheets

LENS BARREL ASSEMBLY AND METHOD

CROSS-REFERENCE TO RELATED PATENT APPLICATION

This application claims the benefit of Korean Patent Application No. 10-2008-0077054, filed on Aug. 6, 2008, in the Korean Intellectual Property Office, the entire contents of which is incorporated herein by reference.

BACKGROUND OF THE INVENTION

1. Field of the Invention

The present invention relates to a lens barrel assembly, and more particularly, to a lens barrel assembly in which a lens barrel is stably moved to improve image quality of an image processing device.

2. Description of the Related Art

In image processing devices, such as digital cameras, or camcorders, a lens is moved along the direction of an optical axis to focus or zoom. The lens is often installed in a lens barrel and moved by a driving means, such as a motor. The lens barrel has a predetermined penetration hole, and a guiding unit disposed to be inserted into the penetration hole guides the lens barrel, thereby allowing the lens barrel to move easily.

Often the lens will vibrate while being moved with a motor which may lower the quality of the obtained image.

SUMMARY OF THE INVENTION

The present disclosure provides a lens barrel assembly in which a lens barrel is stably moved to improve image quality of an image processing device.

A lens barrel assembly is disclosed. The lens barrel assembly including comprising: a lens barrel in which at least one lens is installed; a driving member that moves the lens barrel along the direction of an optical axis; a base at which the driving member is accommodated; a guide member that is formed on the base and guides a movement of the lens barrel; and an elastic unit that connects the base and the lens barrel and comprises a plurality of elastic members.

The elastic unit may include a flat-shaped elastic member. The flat-shaped elastic member may have at least one looped portion. The lens barrel may have a guide hole, and the guide member is inserted into the guide hole so that the guide member guides the movement of the lens barrel.

The elastic unit may include a first elastic member and a second elastic member, wherein an end of the first elastic member is connected to the lens barrel, the other end of the first elastic member is connected to an end of the second elastic member, and the other end of the second elastic member is connected to the base.

The first elastic member may include a tension coil spring, and the second elastic member comprises a flat spring. The end of the second elastic member may include an attachment portion to couple with the first elastic member. The other end of the second elastic member may be combined with the base with a screw. The elastic unit may include a spring and at least one additional elastic member.

The elastic unit may include a first elastic member, wherein an end of the first elastic member is connected to the lens barrel, the other end of the first elastic member is connected to a second elastic member; and a third elastic member, wherein an end of the third elastic member is connected to the base, the other end of the third elastic member is connected to the second elastic member.

The second elastic member may be a spring. The third elastic member may have at least one looped portion. The first elastic member may have at least one looped portion.

A method of moving a lens is disclosed. The method may include activating a driving member that moves a lens barrel including the lens along the direction of an optical axis; providing a stabilizing force during the activating that moves the lens with an elastic unit that connects the base and the lens barrel.

Providing a stabilizing force may include providing a stabilizing force during the activation that moves the lens by providing a stabilizing force with a first elastic member with an end of the first elastic member connected to the lens barrel and the other end of the first elastic member connected to a spring, and providing a stabilizing force with a second elastic member with an end of the second elastic member connected to the base and the other end of the second elastic member connected to the spring.

Providing a stabilizing force may include providing a stabilizing force with three elastic members, the first elastic member connected to the lens barrel and a spring, the spring connected to the first elastic member and a second elastic member, the second elastic member connected to the spring and a base.

Providing a stabilizing force may include providing a stabilizing force with at least two elastic member such that when the lens barrel is not at a distance far from the base, the elastic unit performs a motion according to elastic motion characteristics of the first elastic member, and when the lens barrel is distanced from the base over a predetermined distance, the elastic unit performs a motion similar to the linear elastic motion according to elastic motion characteristics of the second elastic member.

The first elastic member may include a tension coil spring, and the second elastic member comprises a flat spring.

The first elastic member may include a tension coil spring and the second elastic member comprises a flat elastic member.

A method of moving a lens is disclosed. The method may include activating a driving member that moves a lens barrel including the lens along the direction of an optical axis; providing a stabilizing force with an elastic unit that connects the base and the lens barrel, the stabilizing force provided by a coil-shaped first elastic member and at least one other elastic member buffering the non-linear elastic motion of the first elastic member.

BRIEF DESCRIPTION OF THE DRAWINGS

The above and other features and advantages of the disclosure will become more apparent by describing in detail exemplary embodiments thereof with reference to the attached drawings in which.

DETAILED DESCRIPTION OF THE INVENTION

Therefore there is a need in the art for a lens barrel assembly including a lens barrel in which at least one lens is installed; a driving member that moves the lens barrel along the direction of an optical axis; a base at which the driving member is accommodated; a guide member that is formed on the base and guides a movement of the lens barrel; and an elastic unit that connects the base and the lens barrel and comprises a plurality of elastic members. The lens barrel assembly can improve image quality of an image processing device by stabilizing the movement of the lens barrel.

Hereinafter, the disclosure of a lens barrel and method of operating the lens barrel will be described more fully with reference to the accompanying drawings, in which exemplary embodiments of the disclosure are shown.

Figure 1:
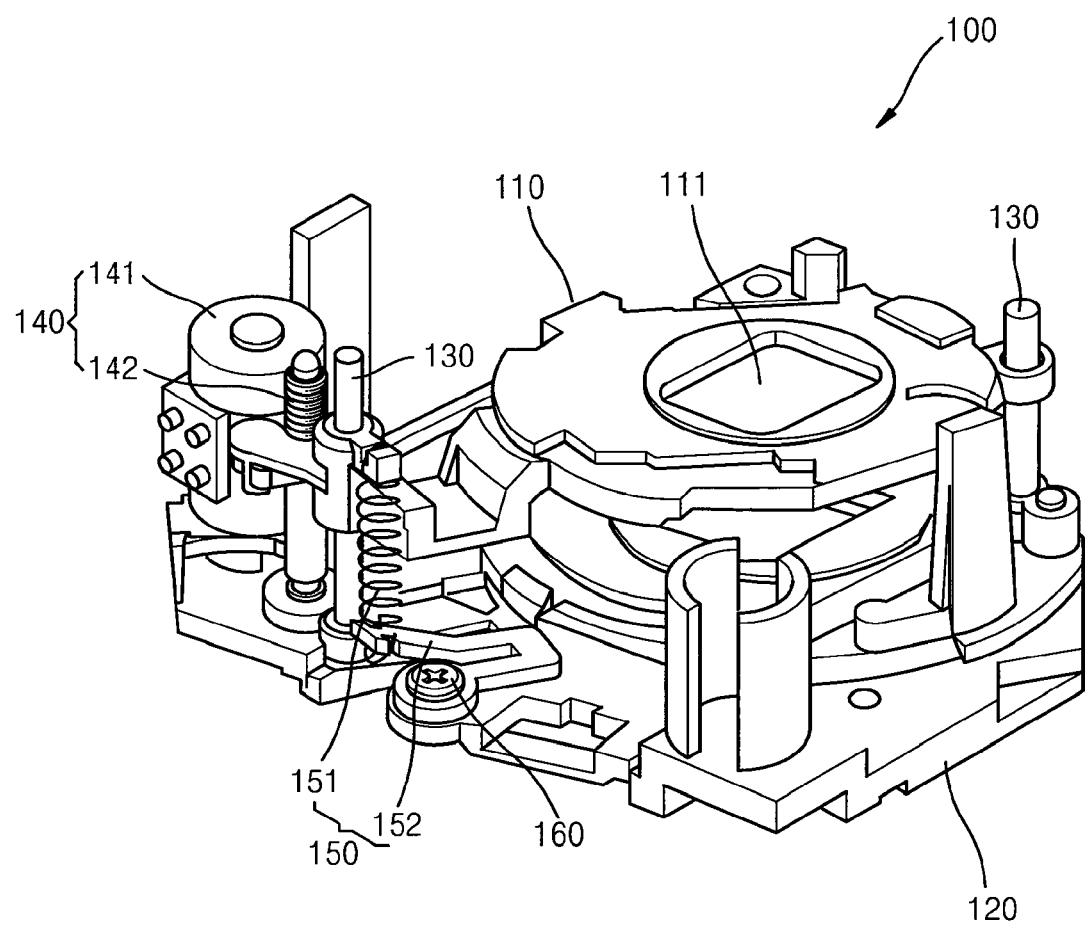
FIG. 1 is a schematic perspective view of an example of a lens barrel assembly according to an embodiment of the disclosure.
Figure 2:
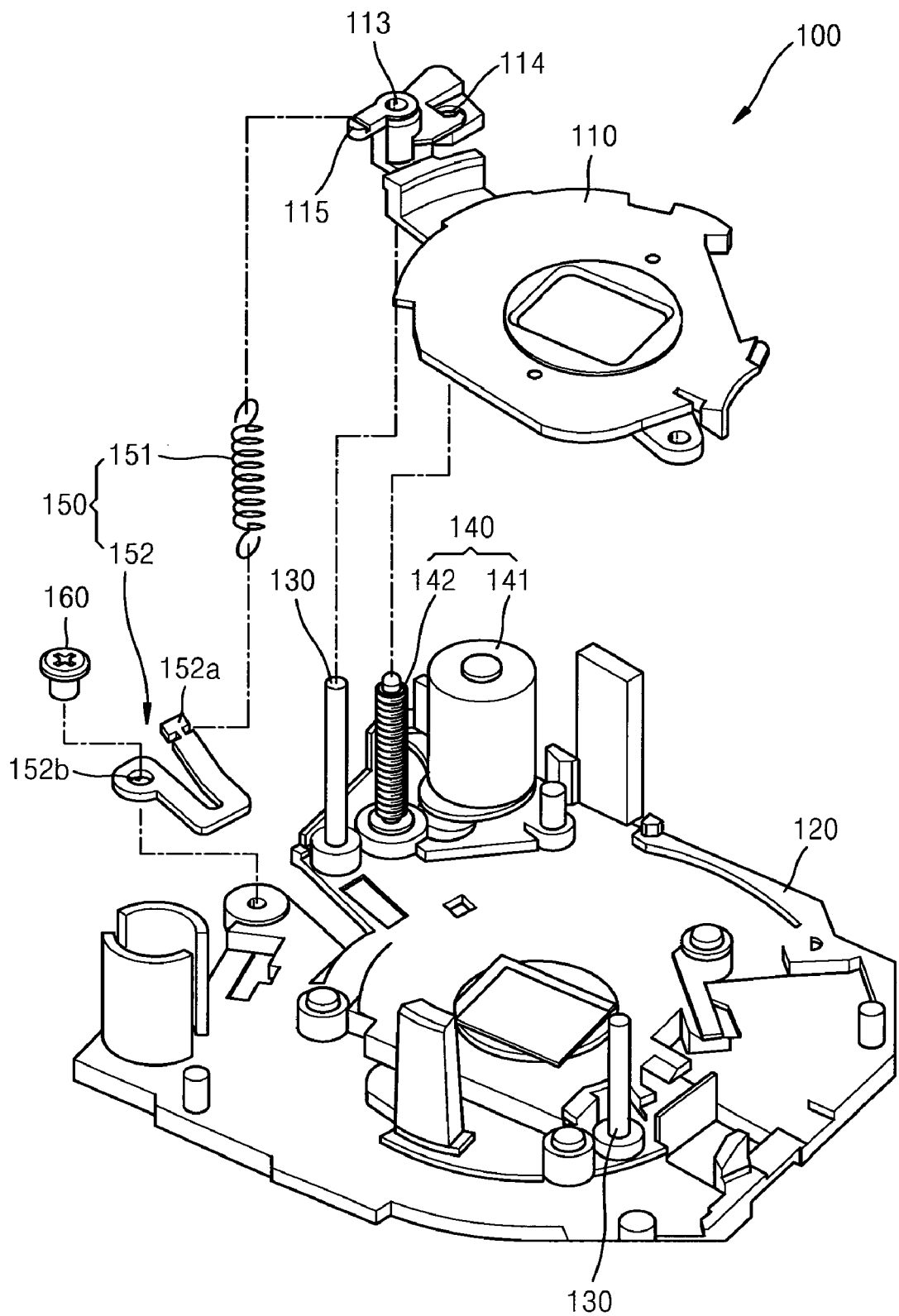
FIG. 2 is an exploded perspective view of the lens barrel assembly of FIG. 1, according to an embodiment of the disclosure.
Figure 3:
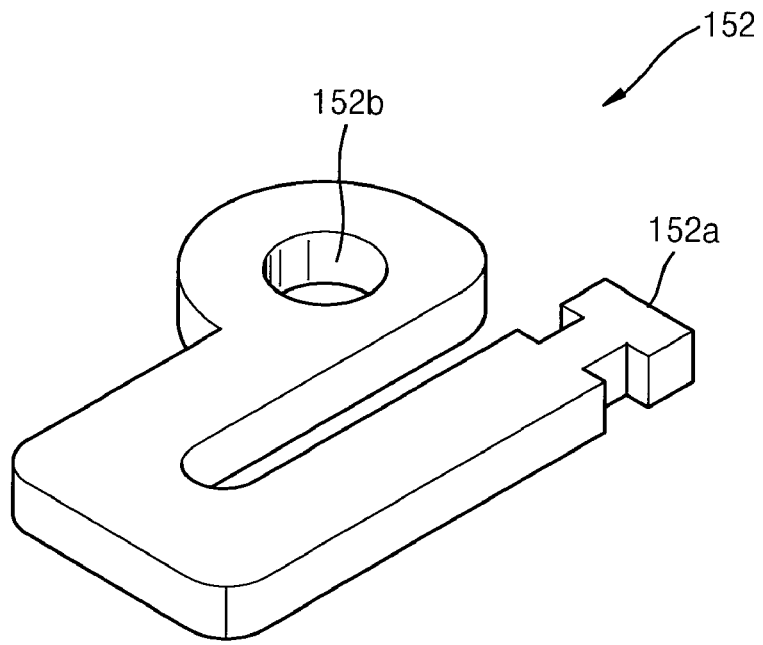
FIG. 3 is an enlarged perspective view of an example of a second elastic member illustrated in FIGS. 1 and 2, according to an embodiment of the disclosure.

FIG. 1 is a schematic perspective view of an example of a lens barrel assembly 100 according to an embodiment of the disclosure. FIG. 2 is an exploded perspective view of the lens barrel assembly 100 of FIG. 1, according to an embodiment of the disclosure. FIG. 3 is an enlarged perspective view of a second elastic member illustrated in FIG. 1, according to an embodiment of the disclosure.

Referring to FIGS. 1 and 2, the lens barrel assembly 100 according to the present embodiment includes a lens barrel 110, a base 120, guide members 130, a driving member 140, and an elastic unit 150.

A lens 111 is installed in the lens barrel 110. According to another embodiment, a plurality of lenses may also be installed in the lens barrel 110. That is, a fixed lens group and a moving lens groups may be installed in the lens barrel 110. A path of a light incident through an optical axis is converted to an optical axis bent at a right angle by a reflection optical element inside the fixed lens group, and the light transmits moving lenses to be incident on a photographing device (not shown), such as a charge coupled device (CCD), thereby being photoelectrically converted, and the photoelectrically converted signal is transferred to a control unit (not shown) of an image processing device. In addition, the lens 111 can perform a focusing lens function.

The lens barrel 110 has guide holes 113 and a lead screw hole 114, which are penetration holes involving the moving of the lens barrel 110, as will be described later in detail.

The driving member 140 and the guide member 130 are disposed on the base 120. In addition, when the elastic unit 150 is disposed on the base 120, an end of the elastic unit 150 is connected to the base 120, and thus, the elastic unit 150 allows the lens barrel 110 to stably move.

The driving member 140 includes a driving motor 141 and a lead screw 142, as means for moving the lens barrel 110. The driving motor 141 may be a general motor or a gear built-in motor. An axis of the driving motor 141 rotates in both directions according to a control signal.

The driving motor 141 and the lead screw 142 are connected by a power transferring means, such as a gear (not shown), or a belt, which is disposed on a lower portion of the base 120. When the driving motor 141 rotates, a driving force of the driving motor 141 is transferred to the lead screw 142 by the power transferring means, such as a gear, whereby the lead screw 142 also rotates.

The driving member 140 may have a variety of other types. A structure in which the lead screw 142 is installed at a rotation axis of the driving motor 141 is also possible.

A screw is disposed on an outer circumference of the lead screw 142. The lead screw 142 is inserted into the lead screw hole 114 of the lens barrel 110. A screw is disposed on an inner circumference of the lead screw hole 114. The screw formed on the outer circumference of the lead screw 412 and the screw formed on the inner circumference of the lead screw hole 114 contact with each other.

When the lead screw 142 is rotated due to the contact between the screws described above, the lens barrel 110 can linearly move in the direction of an optical axis.

The guide member 130 is in the form of a pillar, and is inserted into the guide hole 113 of the lens barrel 110. In the present embodiment, two guide members 130 are illustrated in FIGS. 1 and 2; however, the disclosure is not limited thereto, and thus, the number of guide members 130 may be appropriately determined taking into consideration a space in which a guide member is installed and relationships between the guide member and other members.

In addition, although two guide holes 113 are illustrated in FIGS. 1 and 2, the number of guide holes may be appropriately determined as in the number of guide members.

In addition, in the present disclosure, the guide member 130 is in the form of a cylinder; however, the present disclosure is not limited thereto, and thus, the guide member 130 can have a variety of other forms. That is, for example, the guide member 130 can be in the form of a pillar with a polygonal cross-section.

In order for the lens barrel 110 to be guided by the guide member 130 in order for the lens barrel 110 to move, the guide member 130 and the guide hole 113 are separated apart from each other by a constant interval.

In the present embodiment, the guide hole 113 and the lead screw hole 114 are formed integrally with the lens barrel 110; however, the present disclosure is not limited thereto, and thus, a connection member may be separately formed from the lens barrel 110 to connect with a main body of the lens barrel 110, and the lead screw hole 114 or the guide hole 113 may be connected to the connection member.

The elastic unit 150 includes a plurality of elastic members. Referring to FIGS. 1 and 2, in the present embodiment, the elastic unit 150 includes a first elastic member 151 and a second elastic member 152. The elastic unit 150 connects the lens barrel 110 and the base 120. In the present embodiment, the first elastic member 151 is a coil-shaped tension spring, and the second elastic member 152 is a flat spring; however, the present disclosure is not limited thereto, and thus, the first and second elastic members 151 and 152 may have a variety of other types. An end of the first elastic member 151 is connected to the lens barrel 110. Referring to FIG. 2, the end of the first elastic member 151 is connected to a connection portion 115 formed in the lens barrel 110. The other end of the first elastic member 151 is connected to an end of the second elastic member 152.

An attachment portion 152a is formed at an end of the second elastic member 152 to connect with the first elastic member 151. The other end of the second elastic member 152 is connected to the base 120. A combination hole 152b is formed in the other end of the second elastic member 152 to connect the second elastic member 152 to the base 120 by a screw 160.

In an embodiment, the connection portion 115 may also be an elastic member.

FIG. 3 is an enlarged perspective view of the example of the second elastic member 152 of FIGS. 1 and 2, according to an embodiment of the present disclosure. Referring to FIG. 3, the second elastic member 152 is a flat spring having a looped portion. That is, the second elastic member 152 has a U shape.

Referring to FIGS. 1 and 2, the second elastic member 152 is disposed such that the looped portion is formed in the direction facing a center portion of the lens barrel 110. However, the disposition of the second elastic member 152 may be determined by a position and type of the lens barrel 110 and a type of the base 120.

The elastic unit 150 prevents a fine vibration of the lens barrel 110 while the lens barrel 110 moves. That is, the elastic unit 150 is connected to the lens barrel 110, thereby allowing a tension between the lens barrel 110 and the driving member 140 to be maintained substantially constant. In addition, the elastic unit 150 includes the plurality of elastic members as described above. Thus, this allows the tension between the lens barrel 110 and the driving member 140 to be maintained more constant, compared with when a single elastic member is used.

In particular, the lead screw 142 of the driving member 140 is inserted into the lead screw hole 114 of the lens barrel 110, and the screw on the outer circumference of the lead screw 142 is coupled with the screw on the inner circumference of the lead screw hole 114, whereby the tension therebetween is maintained constant. Thus, the driving force of the driving motor 141 is easily transferred to the lens barrel 110, and the transfer of the driving force may also be controlled finely. As the transfer of the driving force is controlled more finely, the movement of the lens barrel 110 can be controlled accurately. Accordingly, position shift, tilting and decentering of the lens barrel 110 may be lessened.

However, in an elastic unit connected to the lens barrel 110, the elastic unit generally comprising a coil-shaped spring, when the spring is stretched over a constant range of length, the movement of the lens barrel 110 cannot be controlled accurately. As a result, the phase shift, tilting and decentering of the lens barrel 110 may occur.

This is because the elastic unit comprising a coil-shaped spring performs a non-linear elastic motion in which the greater the spring is stretched, the more a load on the spring increases rapidly.

That is, when the elastic unit comprising a coil-shaped spring is stretched over a predetermined length, the elastic unit performs a non-linear elastic motion. As the length of the stretch increases, an amount of change in the load rapidly increases. Thus, it is very difficult to accurately control the movement of the lens barrel 110.

A commonly used elastic unit comprises a coil-shaped spring that has a constant diameter and is coiled several times. When the lens barrel 110 is distanced from the base 120, the coil-shaped spring is stretched. The coil-shaped spring generally performs a linear elastic motion, but starts to perform a non-linear elastic motion when the coil-shaped spring is stretched over a constant range of length.

In addition, the elastic unit comprising the coil-shaped spring may cause decentering and tilting of the lens 111 due to a rapid change in stress. Thus, there is a limitation in accurate operation by users. In particular, even when the driving motor 141 is driven as calculated to make the lens barrel 110 move to a desired position, an error in an actual position of the lens barrel 110 often occurs due to the non-linear elastic motion of the elastic unit.

Consequently, even when focusing is determined to be completed in a control unit of an image processing device including the lens barrel 110, the lens barrel 110 is actually not in a desired position. Thus, it may be difficult to capture images with excellent quality.

However, the elastic unit 150 according to the present invention can include a plurality of elastic members, in particular, a flat-shaped elastic member. The flat-shaped elastic member has a poorer capability of maintaining tension than the coil-shaped elastic member, even if the flat-shaped elastic member performs a linear elastic motion over wide stretching ranges.

The second elastic member 152, connected to the end of the first elastic member 151, is a flat spring, and is connected to the coil-shaped first elastic member 151, thereby buffering the non-linear elastic motion of the first elastic member 151. That is, when the lens barrel 110 is not at a distance far from the base 120, the elastic unit 150 performs a motion according to elastic motion characteristics of the first elastic member 151, and when the lens barrel 110 is distanced from the base over a predetermined distance, the elastic unit 150 performs a motion similar to the linear elastic motion according to elastic motion characteristics of the second elastic member 152.

A detailed description of this is as follows. When the lens barrel 110 is gradually distanced from the base 120 by moving, the first and second elastic members 151 and 152 are stretched. In this regard, when the first elastic member 151 is stretched less than a predetermined distance, the first elastic member 151 performs a linear elastic motion, whereby the stable movement of the lens barrel 110 can be obtained.

However, when the lens barrel 110 is distanced from the base 120 over a certain distance, the first elastic member 151 is stretched over a predetermined distance, thereby performing a non-linear elastic motion. Thus, due to the linear elastic motion of the second elastic member 152 connected to the first elastic member 151, an impact of the first elastic member 151 on the whole elastic unit 150 due to the non-linear elastic motion of the first elastic member 151 decreases.

Consequently, the elastic unit 150 mainly performs a linear elastic motion regardless of the length of the stretch. When the elastic unit 150 performs the linear elastic motion, the elastic unit 150 stably supports the lens barrel 110, thereby allowing the position of the lens barrel 110 to be accurately controlled.

As a result, the lens barrel 110 can easily be moved to a desired position, and thus images with a desire image quality can easily be realized.

The second elastic member 152 may, although not illustrated in the drawings, have a plurality of looped portions. As the second elastic member 152 has a greater number of looped portions, an amount of change in load according to strain can be maintained constant. Thus, the linear elastic motion of the elastic unit 150 can be performed more easily due to the inclusion of the second elastic member 152.

In addition, as the width of the second elastic member 152 decreases and the length of the second elastic member 152 increases, the amount of the change in load decreases. As a result, the linear elastic motion of the elastic unit 150 can be performed more easily.

The lens barrel assembly 100 according to the present embodiment includes the elastic unit 150 including the second elastic member 152 in the form of a flat spring. Since the elastic unit 150 mainly performs the linear elastic motion, the change in load is constant in spite of a change in the length of the stretch. Accordingly, when the lens barrel 110 is moved by the driving member 140, the tension between the lens barrel 110 and the driving member 140 can be maintained stably.

Thus, when a focusing or zoom function is performed in an image processing device including the lens barrel assembly 100, the lens can be moved to an accurate position as controlled by the control unit of the image processing device. In addition, malfunctions, such as decentering of the lens and tilting of the lens, are prevented and thus images with a desired image quality can easily be realized.

Figure 4:
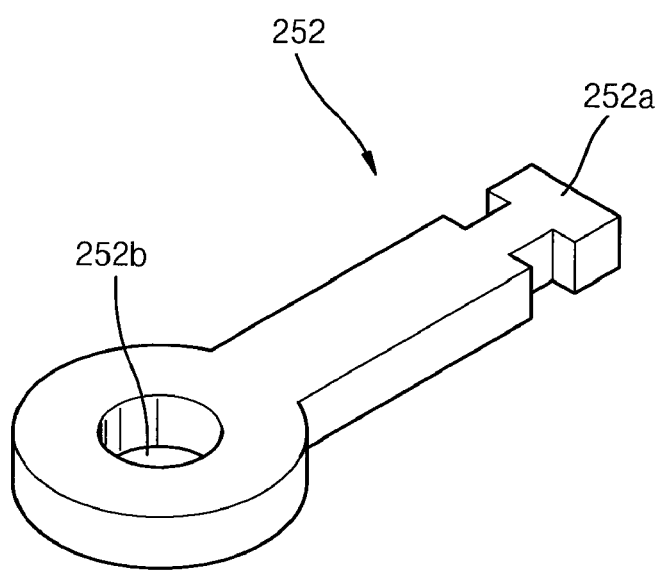
FIG. 4 is an enlarged perspective view of an example of a second elastic member illustrated in FIGS. 1 and 2, according to another embodiment of the disclosure.

FIG. 4 is an enlarged perspective view of an example of the second elastic member 252 illustrated in FIGS. 1 and 2, according to another embodiment of the present disclosure.

Referring to FIG. 4, the second elastic member 252 is formed in a straight line shape. That is, the second elastic member 252 does not have the looped portion. The amount of change in load on the second elastic member 252 illustrated in FIG. 4 may be greater than that on the second elastic member 152 of FIG. 3. The second elastic member 252 includes an attachment portion 252a and a connection hole 252b.

The width and length of the second elastic member 252 may be variously determined. As the width of the second elastic member 252 decreases, the elastic unit 50 mainly may perform a motion similar to the linear elastic motion. In addition, as the length of the second elastic member 252 is increased, the elastic unit mainly may perform a motion similar to the linear elastic motion.

According to the above embodiments of the present disclosure, a lens barrel assembly can improve image quality of an image processing device by stabilizing the movement of a lens barrel.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A lens barrel assembly comprising:
a lens barrel in which at least one lens is installed;
a driving member that moves the lens barrel along the direction of an optical axis;
a base at which the driving member is accommodated;
a guide member that is formed on the base and guides a movement of the lens barrel; and
an elastic unit that connects the base and the lens barrel and comprises a plurality of elastic members, wherein the elastic unit comprises a first elastic member and a second elastic member, wherein an end of the first elastic member is connected to the lens barrel, the other end of the first elastic member is connected to an end of the second elastic member, and the other end of the second elastic member is connected to the base.

2. The lens barrel assembly of claim 1, wherein the elastic unit comprises a flat-shaped elastic member.

3. The lens barrel assembly of claim 2, wherein the flat-shaped elastic member has at least one looped portion.

4. The lens barrel assembly of claim 1, wherein the lens barrel has a guide hole, and the guide member is inserted into the guide hole so that the guide member guides the movement of the lens barrel.

5. The lens barrel assembly of claim 1, wherein the first elastic member comprises a tension coil spring, and the second elastic member comprises a flat spring.

6. The lens barrel assembly of claim 1, wherein the end of the second elastic member comprises an attachment portion to couple with the first elastic member.

7. The lens barrel assembly of claim 1, wherein the other end of the second elastic member is combined with the base with a screw.

8. The lens barrel assembly of claim 1, wherein the elastic unit comprises a spring and at least one additional elastic member.

9. The lens barrel assembly comprising:
a lens barrel in which at least one lens is installed;
a driving member that moves the lens barrel along the direction of an optical axis;
a base at which the driving member is accommodated;
a guide member that is informed on the base and guides a movement of the lens barrel; an elastic unit that is formed on the base and comprises a plurality of elastic members, wherein the elastic unit comprises:
a first elastic member, wherein an end of the first elastic member is connected to the lens barrel, the other end of the first elastic member is connected to a second elastic member;
a third elastic member, wherein an end of the third elastic member is connected to the base, the other end of the third elastic member is connected to the second elastic member.

10. The lens barrel assembly of claim 9, wherein the second elastic member is a spring.

11. The lens barrel assembly of claim 9, wherein the third elastic member has at least one looped portion.

12. The lens barrel assembly of claim 9, wherein the first elastic member has at least one looped portion.

13. A method of moving a lens, comprising:
activating a driving member that moves a lens barrel including the lens along the direction of an optical axis;
providing a stabilizing force during the activating that moves the lens with an elastic unit that connects the base and the lens barrel, wherein providing a stabilizing force, further comprises:
providing a stabilizing force during the activation that moves the lens by providing a stabilizing force with a first elastic member with an end of the first elastic member connected to the lens barrel the other end of the first elastic member connected to a second elastic member, and providing a stabilizing force with a second elastic member with an end of the second elastic member connected to the base and the other end of the second elastic member connected to the first elastic member.

14. The method of moving a lens, comprising:
activating a driving member that moves a lens barrel including the lens along the direction of an optical axis;
providing a stabilizing force during the activating that moves the lens with an elastic unit that connects the base and the lens barrel, wherein providing a stabilizing force, further comprises:
providing a stabilizing force with three elastic members, the first elastic member connected to the lens barrel and a spring, the spring connected to the elastic member and a second elastic member, the second elastic member connected to the spring and a base.

15. A method of moving a lens, comprising:
activating a driving member that moves a lens barrel including the lens along the direction of an optical axis;
providing a stabilizing force during the activating that moves the lens with an elastic unit that connects the base and lens barrel, wherein providing a stabilizing force, further comprises:
providing a stabilizing force with at least two elastic member such that when the lens barrel is not at a distance far from the base, the elastic unit performs a motion according to elastic motion characteristics of the first elastic member, and when the lens barrel is distanced from the base over a predetermined distance, the elastic unit performs a motion similar to the linear elastic motion according to elastic motion characteristics of the second elastic member.

16. The method of claim 15, wherein the first elastic member comprises a tension coil spring, and the second elastic member comprises a flat spring.

17. The method of claim 15, wherein the first elastic member comprises a tension coil spring and the second elastic member comprises a flat elastic member.

* * * * *

UNITED STATES PATENT AND TRADEMARK OFFICE
CERTIFICATE OF CORRECTION

| | | |
|---|---|---|
| PATENT NO. | : 8,027,105 B2 | Page 1 of 1 |
| APPLICATION NO. | : 12/534958 | |
| DATED | : September 27, 2011 | |
| INVENTOR(S) | : Hyun-min Oh | |

It is certified that error appears in the above-identified patent and that said Letters Patent is hereby corrected as shown below:

In Claim 9, replace in:

Column 7, line 58, "The lens barrel assembly" with --A lens barrel assembly--;

Column 7, line 63, "a guide member that is informed" with --a guide member that is formed--;

Column 7, lines 64-65, "an elastic unit that is formed on the base and comprises a plurality of elastic members" with --an elastic unit that connects the base and the lens barrel and comprises a plurality of elastic members--.

In Claim 14, replace in:

Column 8, line 31, "The method of moving a lens" with --A method of moving a lens--;

Column 8, line 40, "the spring connected to the elastic member" with --the spring connected to the first elastic member--.

In Claim 15, Column 8, line 48, replace "and lens barrel" with --and the lens barrel--.

Signed and Sealed this
Sixth Day of December, 2011

David J. Kappos
*Director of the United States Patent and Trademark Office*